(12) United States Patent
Chen

(10) Patent No.: US 6,601,281 B1
(45) Date of Patent: Aug. 5, 2003

(54) METHOD FOR MOLDING SUBSTANCE ON SUBSTRATE AND DEVICE FORMED THEREBY

(75) Inventor: Chien-Hung Chen, Taoyuan (TW)

(73) Assignee: High Tech Computer Corporation, Taoyuan (TW)

( * ) Notice: Subject to any disclaimer, the term of this patent is extended or adjusted under 35 U.S.C. 154(b) by 0 days.

(21) Appl. No.: 09/591,325

(22) Filed: Jun. 9, 2000

(51) Int. Cl.⁷ .............................................. B29C 41/00
(52) U.S. Cl. ..................... 29/418; 29/527.1; 29/530; 264/259; 264/275
(58) Field of Search ................. 29/418, 527.1, 29/530; 264/259, 275

(56) References Cited

U.S. PATENT DOCUMENTS 4,235,832 A * 11/1980 Leighton .................... 264/275
5,893,210 A * 4/1999 Takei et al. ................. 264/275

* cited by examiner

Primary Examiner—David P. Bryant
Assistant Examiner—Jermie E. Cozart
(74) Attorney, Agent, or Firm—Niro Scavone Haller & Niro

(57) ABSTRACT

A method for molding a molded substance to a substrate is provided. A substrate connected to a fixing portion by a connecting portion is prepared. The substrate is placed in a mold, wherein a portion of the fixing portion is protruding from the mold. The fixing portion is fixed by a fixing device outside the mold. Then, the molded substance covering the substrate is formed within the mold.

17 Claims, 4 Drawing Sheets

METHOD FOR MOLDING SUBSTANCE ON SUBSTRATE AND DEVICE FORMED THEREBY

FIELD OF THE INVENTION

The present invention relates to a molding method and device formed thereby, and more particularly relates to a method for molding one substance to another substance and the molded product.

BACKGROUND OF THE INVENTION

Diversified appearances can be obtained by molding processes. However, some molding materials are not heavy or strong enough in some application. For solving the above-mentioned or other problems, sometimes it is desirable to mold one substance to another substrate made of different material.

When proceeding such a molding process, it is very important to maintain the mold and the substrate in a fixed position. However, it is difficult to fix the substrate within the mold since the molding material is often injected into the mold cavity with high pressure. For solving such a problem, a substrate holder installed within the mold is used. A portion of the molded shell is performed while the substrate is fixed by the substrate holder. Then the holder is removed and the remaining molding process is performed. However, such a process is very troublesome. It is then attempted by the Applicant to solve the above-mentioned problems.

SUMMARY OF THE INVENTION

An object of the present invention is to provide a method for molding one substance on a substrate.

Another object of the present invention is to provide a molded device having a core substrate enveloped by a molded shell.

According to the present invention, a method for molding a molded substance to a substrate is provided. First of all, a substrate connected to a fixing portion by a connecting portion is prepared. The substrate is placed in a mold, wherein a portion of the fixing portion is protruding from the mold. The fixing portion is fixed by a fixing device outside the mold. Then, the molded substance covering the substrate is formed in the mold.

Preferably, the method further includes a step of removing the fixing portion from the substrate and the molded substance. To execute this step, the connecting portion is capable of being separated by an external force exerted on the portion of the fixing portion protruding from the mold.

It is preferable to form the fixing portion and the substrate integrally. Preferably, the connecting portion is a groove.

When the fixing portion is removed from the molded substance, a hole is formed on the surface of the molded substance. It is preferable to fill up the hole by a filling substance. Preferably, the filling substance is pre-molded. More preferably, the filling substance and the molded substance are made of the same material.

The fixing portion preferably includes a structure for preventing the substrate moving away from the fixing device. The structure of the fixing portion preferably includes a body portion connecting to the substrate; and a top portion connecting to and larger than the body portion.

The fixing device preferably further includes an opening having a width smaller than that of the top portion for preventing the top portion from leaving said fixing device.

According to another aspect of the present invention, a method for molding a first substance to a second substance is provided. The method includes steps of: preparing the second substance, wherein the second substance is connected to a plurality of fixing portions; placing the second substance in a mold, wherein the plurality of fixing portions are protruding from the, mold; fixing the second substance by fixing the plurality of fixing portions; and injecting a material of the first substance into the mold to form the first substance on the second substance.

Preferably, one or more of the plurality of fixing portions is/are connected to the second substance by a connecting portion capable of being broken for separating this fixing portion from the second substance. The first fixing portion is preferably integrally formed with the second substance. Preferably, the connecting portion is a groove.

When the first fixing portion is separated from the second substance, a hole will be formed on the first substance. It is preferable to fill up the hole with a filling substance.

One or more than one of the plurality of fixing portions may be made of material the same as that of the first substance.

It is preferable to form an opening on the second substance so that a specific one of the plurality of fixing portions can be plugged onto the substrate through the opening.

According to another aspect of the present invention, a molded device is provided. The molded device includes a substrate; a molded substance covering the substrate except at least one hole, wherein the molded substance is formed by only one molding process; and a filling substance filling up the at least one hole.

The filling substance and the molded substance are preferably made of the same material.

The substrate is preferably made of metal.

The molded substance is preferably made of plastic.

The molded device preferably further includes an opening formed on the substrate and an element capable of performing a specific function, wherein the element is plugged on the opening.

Preferably, a portion of the element is covered by the molded substance.

The present invention may best be understood through the following description with reference to the accompanying drawings, in which:

DETAILED DESCRIPTION OF THE PREFERRED EMBODIMENTS

Figure 1A:
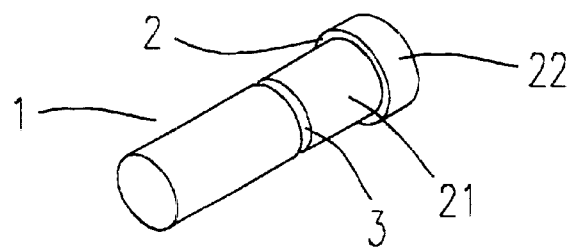
FIGS. 1(a)–1(e) illustrate a preferred embodiment of a molding method according to the present invention.

An illustration of how to manufacture the molded device of the present invention is shown in FIGS. 1(a) to 1(e). Referring to FIG. 1(a), a substrate 1 is prepared before the molding process. The substrate 1 is cylindrical or any other shape as desired. The substrate 1 is connected to a fixing portion 2 with a connecting portion 3. The connecting portion 3 may be a groove, a slot, a notch, or any other structure that may be separated by a force exerted on the fixing portion 2. Once the connecting portion 3 is broken, the fixing portion 2 is separated from the substrate 1. Preferably, the substrate 1, the fixing portion 2, and the connecting portion 3 are integrally formed. They may be directly manufactured from a block of raw material such as metal by lathing, stamping, and/or any other machining processes. The fixing portion 2 is so constructed that it is capable of being properly held or clamped by a fixing device. Accordingly, the substrate 1 can be fixed within the mold during the molding process. The two cylinders 21 and 22 with different radius, as shown in FIG. 1(a), are constructed for the above-mentioned purpose. Of course, any other structure or shape capable of performing similar function is also available.

Figure 1B:
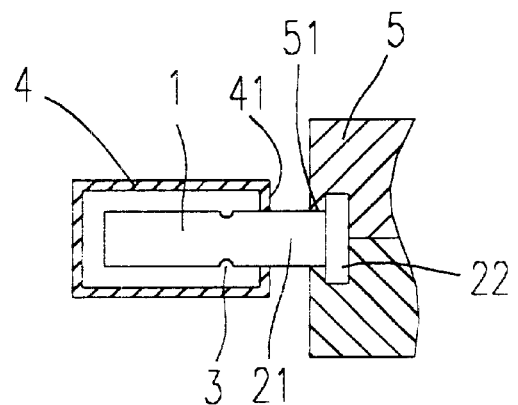

The substrate 1 is then placed into a mold 4. The fixing portion 2 is exposed from the mold 4 so that it can be held or clamped by a fixing device 5. Referring to FIG. 1(b), the fixing device 5 includes an opening 51. When the fixing portion 2 is fixed by the fixing device 5, the width of the opening 51 is similar to that of the body portion 21 and is smaller than that of the top portion 22. Accordingly, the opening 51 can prevent a movement of the substrate 1 due to the injection of the molding material. The injected material is injected into the mold 4 through the nozzle 41. Since the injected material is injected into the mold 4 with high velocity and viscosity, a drag force intending to pull the substrate 1 away from the fixing device 5 will be occurred. However, since the top portion 22 is stopped by the opening 51, the substrate 1 will not be moved by such a drag force during the molding process. After the injection process, a molded substance 6 is formed on the surface of the substrate 1. The molded substance 6 covers the connecting portion 3 and a portion of the fixing portion 2.

Figure 1C:
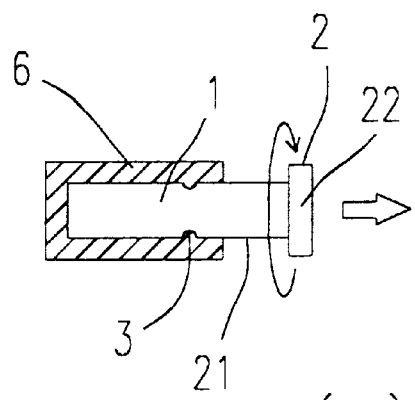

The molded substrate 6 is molded to the substrate 1 while the substrate 1 is properly fixed. If needed, the fixing portion 2 can be separated from the substrate 1 and the molded substance 6. FIG. 1(c) illustrates an example of how to remove the fixing portion 2 from the substrate 1 and the molded substance 6. The fixing portion 2 is twisted and/or tore and pulled off the substance 6. The connecting portion 3 can be any structure capable of helping such a separation. The substrate 1 and the fixing portion 2 can be formed integrally. They can also be two individual elements connected by the connecting portion 3.

Figure 1D:
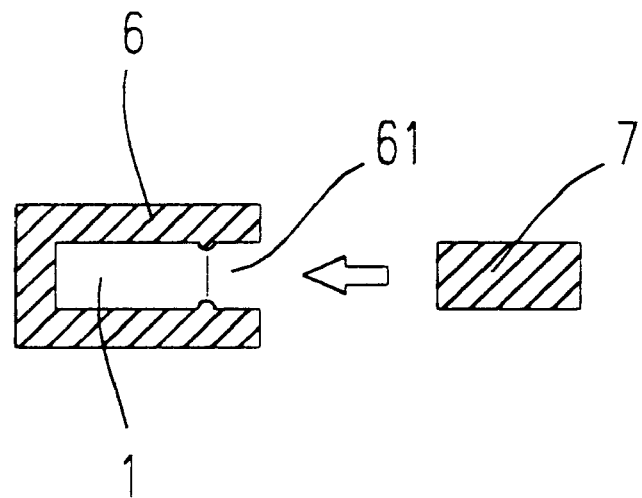

Once the fixing portion 2 is removed, a hole 61 is formed on the molded substance 61. As shown in FIG. 1(d), it is preferable to fill the hole 61 by a filling substance 7. The filling substance 7 can be made of material the same as that of the molded substance 6. It can also be made of other material. The filling substance 7 can be pre-molded by other mold.

Figure 1E:
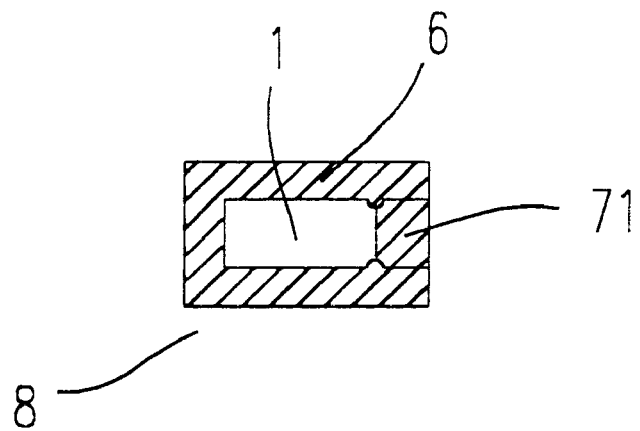

Referring to FIG. 1(e), succeeding mechanical processes can be performed to remove a portion of the filling substance 7 protruding from the surface of the molded substance 6. After a surface-trimming process, it looks like that the remaining portion 71 is integrally formed with the molded substance 6. Therefore, a molded device/element having a substrate enveloped by a molded substance is obtained. Furthermore, the molded substance can be formed by only one injecting process.

The substrate may be made of metal or other material as desired. The molded substrate may be made of plastic or other material as desired.

Figure 2A:
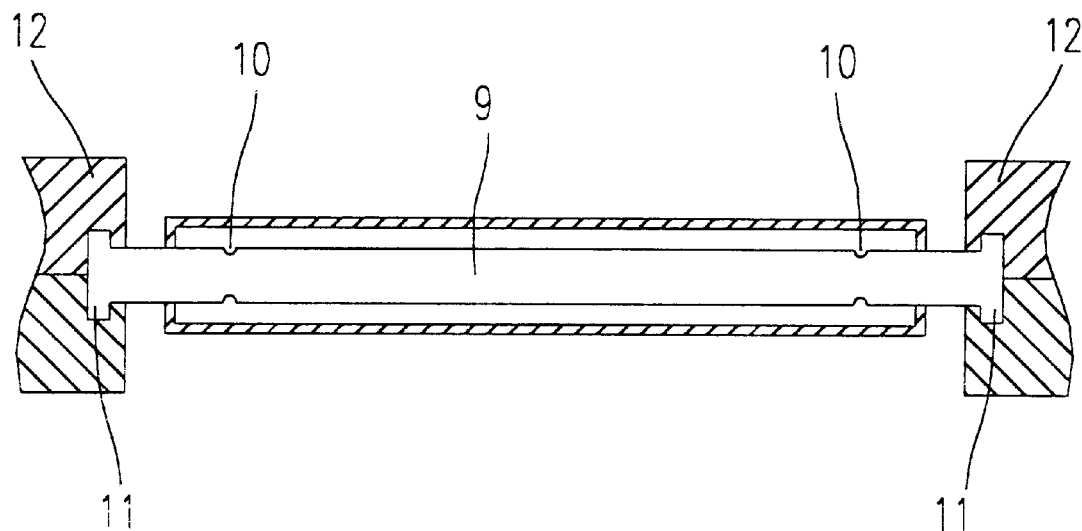
FIGS. 2(a)–2(b) illustrate another preferred embodiment of a molding method according to the present invention.

If needed, more than one fixing portion can be applied. Referring to FIG. 2(a), the substrate 9 is connected to fixing portions 11 with connecting portions 10 respectively. The fixing portions 11 are respectively fixed by fixing devices 12. The fixing portions 11 can be formed integrally with the substrate 9. It is also possible that one or more fixing portions 11 is/are replaced by other material. However, since the injected material, especially the portion near the injecting nozzle of the mold, has a considerable high temperature, the heat-resistance of the fixing portion and the location of the injecting nozzle must be considered carefully. If the distance between a fixing portion with a low heat-resistance and the injecting nozzle is short, the fixing portion may be melt down by the injected material. Of course, when such a fixing portion is far from the injecting nozzle, the injected material has already been cooled before contacting the fixing portion. In such a situation, a relatively low heat-resistance material such as plastic can be chosen to manufacture the fixing portion.

Figure 2B:
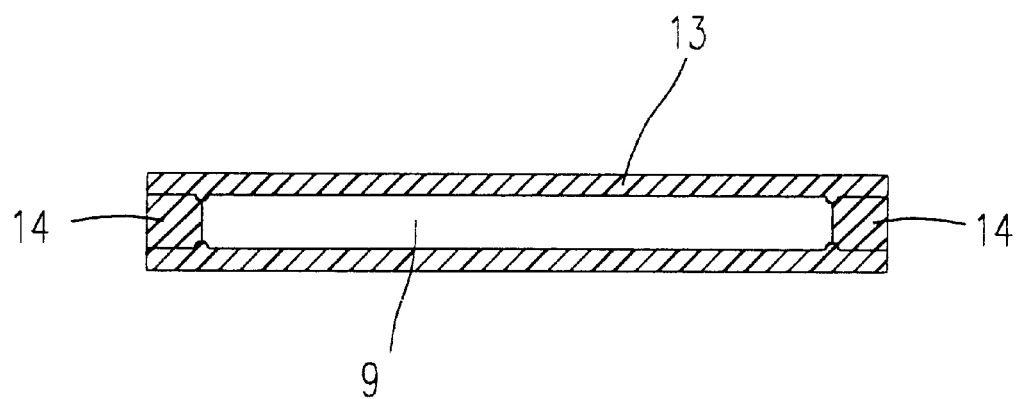

Referring to FIG. 2(b), with processes similar to those shown in FIGS. 1(c) to 1(e), the molded substance 13 is formed on the substrate 9. The holes caused by the fixing portions are filled with filling substances 14. The filling substances 14 are often made of material the same as the molded substance 13. Of course, if one or more fixing portions 11 are made by material the same as the filling substances 14, it is not necessary to remove such a fixing portion, and a trimming process is directly executed to obtain the product shown in FIG. 2(b).

Figure 3A:
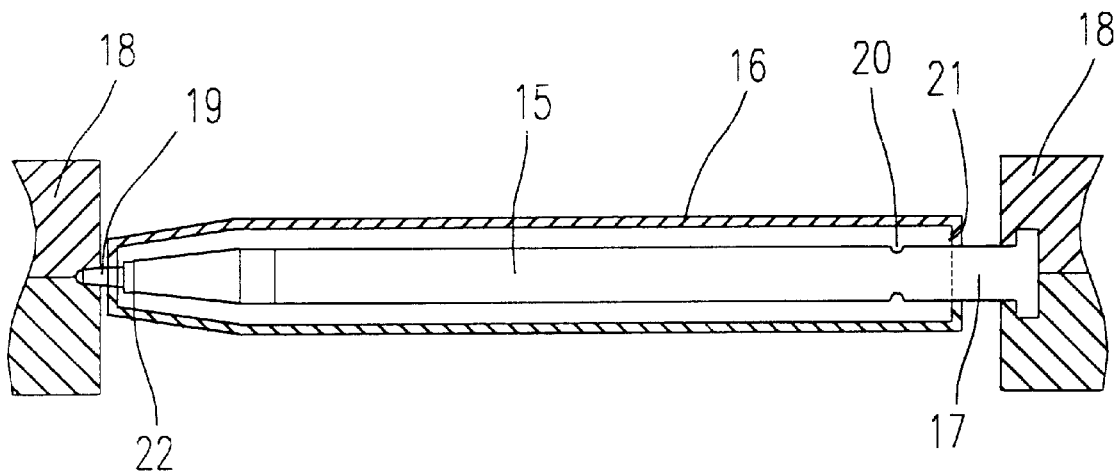
FIGS. 3(a)–3(b) shows still another preferred embodiment of a molding method according to the present invention.
Figure 3B:
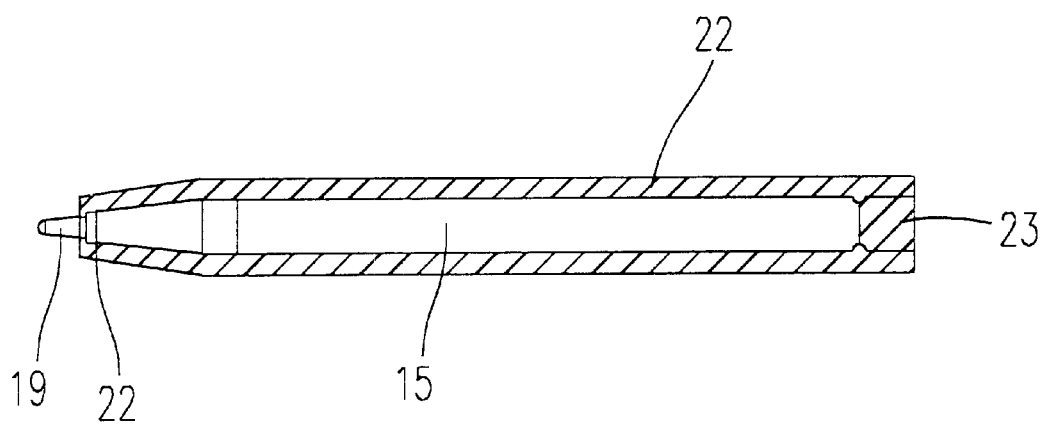

In some applications, one or more of the fixing portion can be replaced by elements capable of performing a specific function. Referring to FIG. 3(a), the substrate 15 is connected to fixing portions 19 and 21. The substrate 15 is connected to the fixing portion 21 by the connecting portion 20. The structures and functions of the fixing portion 17 are similar to those shown in FIGS. 1(b) and 2(a). However, the fixing portion 19 is a pen tip plugged on an opening 22 formed at one end of the substrate 15. When the substrate 15 is placed into a mold 16, the ends of the fixing portions 19 and 21 are exposed from the mold 16 and are fixed by the fixing devices 18. If the fixing portion 19 is made of plastic or other material having relatively low heat resistance, the molded material has to be injected from the nozzle 21 which are far from the fixing portion 19. The product after the molding process is shown in FIG. 3(b). The substrate 15 and a portion of the fixing portion 19 are covered by the molded substance 22 formed during the molding process. Accordingly, the fixing portion 19 will by properly connected to the substrate 15 by the molded substance 22. The hole formed due to the removal of the fixing portion 17 is filled up by the filling substance 23.

By the molding method of the present invention, the rigidity and/or the weight of a molded device/element are improved. The molded substance can be molded to the substrate by only one molding process. The method and device of the present invention can be applied to any filed that needs to mold a substance to another substance.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for molding a molded substance to substrate, comprising; preparing said substrate connected to a fixing portion by a connecting portion; placing said substrate in a mold, wherein a portion of said fixing portion is protruding from said mold; fixing said fixing portion by a fixing device outside said mold; executing a molding process in said mold to form said molding substance covering said substrate; and removing said fixing portion from said substrate and said molded substance.

2. A method according to claim 1, wherein said connecting portion is capable of being separated by an external force exerted on said portion of said fixing portion protruding from said mold.

3. A method according to claim 1 wherein said fixing portion and said substrate are formed integrally.

4. A method according to claim 3 wherein said connecting portion is a groove.

5. A method according to claim 1 wherein a hole is formed on said molded substance when said fixing portion is removed from said molded substance.

6. A method according to claim 5, further comprising a step of filling up said hole by a filling substance.

7. A method according to claim 6 wherein said filling substance is pre-molded.

8. A method according to claim 6 wherein said filling substance and said molded substance are made of the same material.

9. A method according to claim 1 wherein said fixing portion includes a structure for preventing said substrate from moving away from said fixing device.

10. A method according to claim 9 wherein said structure of said fixing portion includes:

a body portion connecting to said substrate; and a top portion connecting to and larger than said body portion.

11. A method according to claim 10 wherein said fixing device further includes an opening having a width smaller than that of said top portion for preventing said top portion from leaving said fixing device.

12. A method for molding a first substance to a second substance; comprising steps of:

preparing said second substance, wherein said second substance is connected to a plurality of fixing portions;

placing said second substance in a mold, wherein said plurality of fixing portions are protruding from said mold;

fixing said second substance by fixing said plurality of fixing portions;

injecting a material of said first substance into said mold to form said first substance on said second substance; and forming a hole on said first substance when a first fixing portion is separate from said second substance, and wherein said method further comprises a step of filling up said hole with a filling substance.

13. A method according to claim 12 wherein said plurality of fixing portions includes said first fixing portion which is connected to said second substance by a connecting portion capable of being broken for separating said first fixing portion from said second substance.

14. A method according to claim 13 wherein said first fixing portion is integrally formed with said second substance.

15. A method according to claim 14 wherein said connecting portion is a groove.

16. A method according to claim 12 wherein a second one of said plurality of fixing portions and said first substance are made of the same material.

17. A method according to claim 12, further comprising a step of:

forming an opening on said second substance; and plugging one of said plurality of fixing portions onto said second substance through said opening.

\* \* \* \* \*